United States Patent [19]
Sakai et al.

[11] Patent Number: 5,454,457
[45] Date of Patent: Oct. 3, 1995

[54] TORQUE COUPLING DEVICE

[75] Inventors: Naoyuki Sakai, Kasugai; Masato Okamoto, Chiryu; Hiroshi Takuno, Aichi, all of Japan

[73] Assignee: Toyoda Koki Kabushiki Kaisha, Kariya, Japan

[21] Appl. No.: 201,032

[22] Filed: Feb. 24, 1994

[30] Foreign Application Priority Data

| Feb. 24, 1993 | [JP] | Japan | 5-035867 |
| Feb. 25, 1993 | [JP] | Japan | 5-036954 |
| Mar. 31, 1993 | [JP] | Japan | 5-074454 |

[51] Int. Cl.⁶ .............. F16D 13/54; F16D 13/75; F16D 25/0638
[52] U.S. Cl. ............. 192/35; 192/82 T; 192/85 AA; 192/103 F
[58] Field of Search ............. 192/35, 57, 58 C, 192/58 B, 82 T, 85 AA, 103 F, 110 R

[56] References Cited

U.S. PATENT DOCUMENTS

| 4,022,084 | 5/1977 | Pagdin et al. | 192/57 X |
| 4,031,780 | 6/1977 | Dolan et al. | |
| 4,040,271 | 8/1977 | Rolt et al. | 192/58 B |
| 4,096,712 | 6/1978 | Webb. | |
| 4,683,997 | 8/1987 | Stockmar et al. | 192/82 T X |
| 4,844,219 | 7/1989 | Stockmar | 192/58 C |
| 5,031,743 | 7/1991 | Morishita et al. | 192/58 C |
| 5,063,738 | 12/1991 | Asano et al. | |

FOREIGN PATENT DOCUMENTS

| 2631062 | 2/1977 | Germany | 192/82 T |
| 0163733 | 10/1982 | Japan | 192/58 B |
| 1-93631 | 4/1989 | Japan. | |
| 0169128 | 7/1989 | Japan | 192/58 B |
| 0113129 | 4/1990 | Japan | 192/82 T |
| 2-66734 | 5/1990 | Japan. | |
| 3-102027 | 8/1990 | Japan. | |
| 3-17434 | 2/1991 | Japan. | |
| 0177628 | 8/1991 | Japan | 192/82 T |

*Primary Examiner*—Rodney H. Bonck
*Attorney, Agent, or Firm*—Oblon, Spivak, McClelland, Maier, & Neustadt

[57] ABSTRACT

A torque coupling device for use as, for example, a so-called center differential provided between front and rear road wheel axles of a four-wheeled vehicle comprises a cup-shape front housing, a rear housing closing an open end of the front housing, a rotational shaft co-axially rotatably supported by the front and rear housings therewithin, and a clutch disc assembly interposed within the front housing between an axial inner end of the front housing and an axial inner end of the rear housing. The initial clearance in axial direction between the clutch assembly and the inner ends of the front and rear housings is tuned so that when the relative rotation between the housings and said rotational shaft causes a certain temperature difference between the housing and the clutch assembly, the difference in thermal expansion between the front housing and the clutch assembly brings clutch discs of the clutch assembly into friction contact to transmit a rotational torque between the housings and the rotational shaft. In a modified form of the coupling device, a piston axially movable relative to, but rotatable bodily with the front housing is interposed between one end of the clutch assembly and the inner end of the rear housing and defines an axially narrow annular spacing between itself and the rear housing. An impeller with radially extending blades is received within the spacing for generating a pressure acting on the piston, through the agency of a high viscous fluid.

7 Claims, 4 Drawing Sheets

TORQUE COUPLING DEVICE

BACKGROUND OF THE INVENTION

1. Field of the Invention

The present invention relates to a torque coupling device provided between two relatively rotatable shafts for transmitting a rotational torque or power therebetween. More particularly, it relates a torque coupling device of the type designed for use, for example, between front and rear road wheel axles of a four-wheeled vehicle.

2. Discussion of the Prior Art

In general, a coupling device for transmitting a torque between front and rear axles of a four-wheeled vehicle is provided with a multiple-disc clutch for transmitting the torque between the front and rear axles by the action of friction engagement of the clutch. In the coupling device of this kind, it may occur that a multiple-disc clutch is damaged because of being overheated when frictional sliding due to incomplete connection is continued for a long period of time for the vehicle to escape from a stuck situation.

Another type of torque coupling devices for the four-wheeled vehicles comprises a torque transmitting multiple disc clutch, a piston for actuating the clutch and pressure generating means for generating a pressure depending on the difference in rotational speed between front and rear road wheels and for applying the pressure to the piston so as to bring the multiple disc clutch into a friction engagement state. In the coupling device of this latter type, the transmissive torque varies as indicated by the solid line in FIG. 7 in dependance upon the differential rotational speed and tends to become saturated within the range of the rotational speed difference being large. This may disadvantageously results in that the multiple disc clutch is damaged because of being overheated when friction sliding due to incomplete connection is continued for a long period of time for the vehicle to escape from a stuck state.

To solve the problems, a torque coupling or transmitting device has been proposed, which as described in Japanese Unexamined Patent Publication No. 1-93631, is provided with a lock-up mechanism utilizing a cam. However, the known device accompanies drawbacks that it becomes large in size due to the incorporation of the lock-up mechanism thereinto and also results in a high manufacturing cost due to increases in number of the parts therefor.

SUMMARY OF THE INVENTION

Accordingly, it is a primary object of the present invention to provide an improved torque coupling device which is simple in construction, reliable in operation, low in cost and light in weight.

Another object of the present invention is to provide an improved torque coupling device which, when a high rotational speed difference occurs between a housing thereof and a rotational shaft carried in the housing, is capable of bringing a multiple-disc clutch assembly used therein into a humping state wherein the transmissive torque abruptly rises, without using a cam-type lock-up mechanism as in the aforementioned prior art device.

A further object of the present invention is to provide an improved torque coupling device which, when a high rotational speed difference occurs between a housing thereof and a rotational shaft carried in the housing, is capable of bringing a multiple-disc clutch assembly used therein into a first humping state and at the subsequent discontinuation of the first humping state, into a second humping state so that a high or heavy torque transmitting state is continued for a relatively long period of time.

Still another object of the present invention is to provide an improved torque coupling device which does not need any actuation means in bringing a multiple disc clutch assembly into a high torque transmitting state when a high rotational speed difference acts on the coupling device.

It is an additional object of the present invention to provide an improved torque coupling device of the character which is applicable to any types of coupling devices incorporating a multiple disc clutch assembly therein.

Briefly, a torque coupling device according to the present invention comprises a clutch assembly including plural clutch discs is received within a housing for transmitting rotational torque between the housing and a rotational shaft rotatably supported in the housing. An initial clearance in axial direction between the housing and the clutch assembly is adjusted or tuned so that when a certain temperature difference takes place between the housing and the clutch assembly, the difference in thermal expansion between the housing and the clutch assembly brings the clutch discs into friction engagement sufficient to transmit a heavy rotational torque between the housing and the rotational shaft, namely into a lock-up state.

With this configuration, the difference in thermal expansion between the housing and the clutch assembly is utilized to bring the clutch discs into friction engagement for torque transmission. More specifically, when a high speed rotational difference occurs between the housing and the rotational shaft, the temperature of the coupling device is increased due to the agitation of clutch lubrication oil and as the case may be, due to slight contacts between the clutch discs. Because the clutch assembly is designed to have a larger coefficient of thermal expansion than the housing, such temperature increase causes a thermal expansion difference between the housing and the clutch assembly to occur. At this time, the clutch assembly axially expands beyond the axial clearance which is initially tuned to exist between the clutch assembly and opposite inner end surfaces of the housing. Thus, as the clutch assembly axially expands over the axial distance between the opposite inner end surfaces of the housing, a compression force acts on the clutch assembly, which is hence brought into a tight or heavy friction engagement state to transmit a heavy drive torque between the housing and the rotational shaft. Since any positive actuation means such as a cam type lock-up mechanism as used in the prior art is not required to bring the clutch assembly into the tight or heavy friction engagement state, the coupling device is simplified in construction, less expensive in cost and reliable and durable in operation.

In another aspect of the invention, pressure generation means and a piston are interposed between an axial end of the housing and a facing axial end of the clutch assembly. When the rotational speed difference between the housing and the rotational shaft is relatively small, the piston is axially moved in response to a pressure generated by the pressure generation means so that the clutch assembly is brought into friction engagement to transmit a relatively small torque. On the other hand, when the rotational speed difference becomes high, the clutch assembly thermally expands in addition to being pressed by the piston and thus, is brought into a tight or heavy friction connection (i.e., lock-up state) to transmit a large or heavy torque. Preferably, the pressure generation means is designed as of the type wherein an impeller displaces a high viscous fluid such as, for example, silicon oil. In this case, the temperature of the clutch assembly is conducted through the piston to the high viscous fluid, which therefore thermally expands to apply an additional force to the piston. Thus, the clutch assembly can be brought into the lock-up state due to the thermal expansion of itself and subsequently, due to the expansion of the high viscous fluid and can be maintained in the tight or heavy contact engagement state for a long time period. This advantageously avoids that a so-called half-clutch state, i.e., an incomplete connection of the clutch discs continues for a long period of time to result in the damage of the clutch discs.

BRIEF DESCRIPTION OF THE ACCOMPANYING DRAWINGS

The foregoing and other objects and many of the attendant advantages of the present invention may be readily appreciated as the same becomes better understood when considered in connection with the accompanying drawings, wherein like reference numerals designate identical or corresponding parts throughout the several views, and in which.

DETAILED DESCRIPTION OF THE PREFERRED EMBODIMENTS

Figure 1:
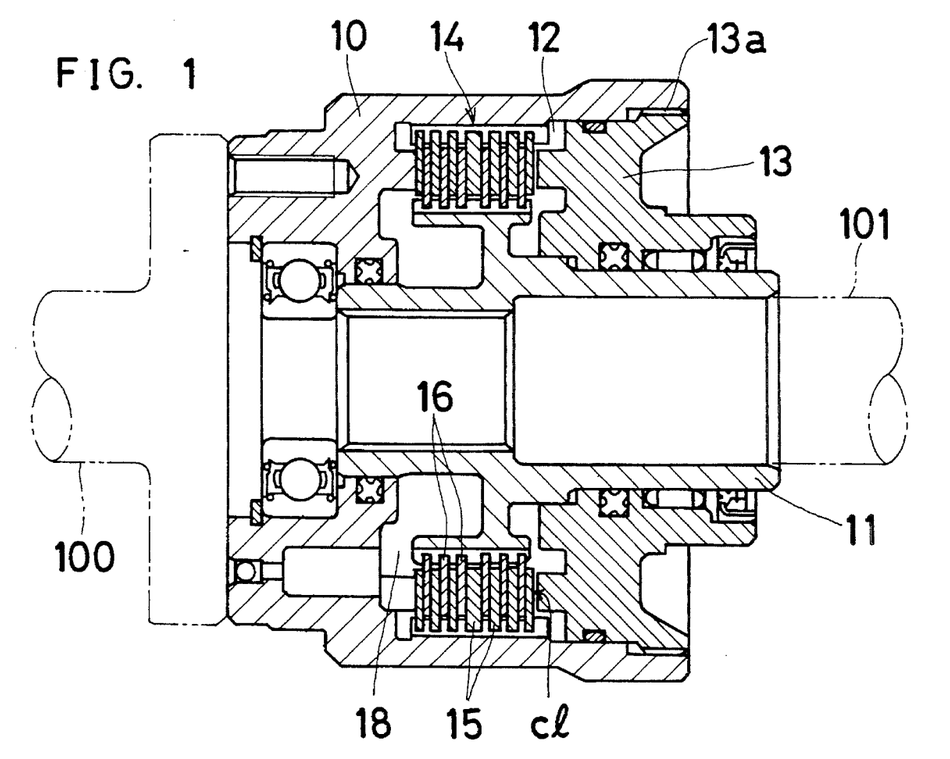
FIG. 1 shows a sectional view of a first embodiment of a torque coupling device according to the present invention.

Referring now to the drawings and particularly to FIG. 1 thereof showing a torque coupling device according to the present invention, reference numeral 10 denotes a front housing of a generally cylindrical or cup shape, which co-axially rotatably supports a hollow rotational shaft 11 therein. In a preferred form of application, the front housing 10 and the rotational shaft 11 may be connected respectively to two relatively rotatable shafts 100, 101, which are in driving connection respectively with front and rear axles (not shown) of a four-wheeled vehicle (not shown). The front housing 10 defines a bore 12 opening at its one end and closed at its other end. The open end of the bore 12 is closed by a rear housing 13 secured at the open end by means of screw means 13a which is formed between the external surface of the rear housing 13 and a mating internal surface of the front housing 10, for position adjustment.

Within the bore 12 and between the bottom end of the front housing 10 and the inner end of the rear housing 13, there is defined a clutch chamber 18, in which a multiple-disc clutch assembly 14 is disposed. The clutch assembly 14 comprises plural outer discs 15 in spline-engagement with the internal surface of the front housing 10 and plural inner discs 16 in spline-engagement with the outer surface of the rotational shaft 11, and these outer and inner discs 15, 16 are arranged in an alternative fashion to be frictionally engageable with each one another. Clutch lubrication oil is filled within the clutch chamber 18.

The housings 10, 13 and the clutch assembly 14 are arranged to provide an initial clearance C1 (e.g., 60 micrometers) therebetween in the state that each of the outer and inner discs 15, 16 of the clutch assembly 14 is in slight contact with one adjoining thereto. The provision of the clearance C1 enables the clutch assembly 14 to be normally kept out of transmitting operation. However, each of the clutch discs 15, 16 is kept substantially in slight contact engagement with one adjoining thereto due to the stress or the like that each of the clutch discs 15, 16 inherently has. Alternatively, a pretorque may be applied by means of a spring (not shown) or the like to the clutch assembly 14 so as to maintain the clutch discs 15, 16 normally in the state of contact engagement.

The operational principle in which rotational torque is generated utilizing the thermal expansion of the clutch assembly 14 will be described hereunder.

Figure 2:
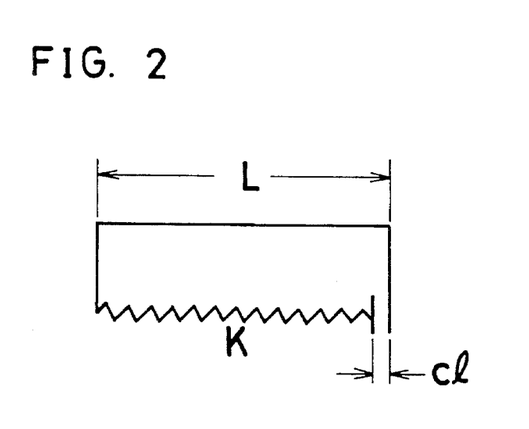
FIG. 2 shows an explanatory view of a rigidity model representing the coupling device shown in FIG. 1.

FIG. 2 illustrates a model representing the coupling device described above. Reference character L denotes the axial length of the clutch assembly 14 and to be more exact, the sum of the axial length of the clutch assembly 14 and the initial clearance C1 at a room temperature. Taking the temperature of the housing 10 as t0, the coefficient of thermal expansion in the housing 10 as $\alpha 0$, the temperature of the clutch assembly 14 as t1, and the coefficient of thermal expansion in the clutch assembly 14 as $\alpha 1$, then, the compression force F that acts on the clutch assembly 14 at the temperature t1 can be expressed by the following approximated equation.

$$F = \frac{(L-C1)(1+\alpha 1 \cdot t1) - L(1+\alpha 0 \cdot t0)}{L(1-\alpha 0 \cdot t0)} \cdot K$$

Herein, F=0 becomes true when the difference in thermal expansion between the clutch assembly 14 and the housing 10 is smaller than the initial clearance C1, while F>0 becomes true when the difference in thermal expansion between the clutch assembly 14 and the housing 10 increases, that is, when the following equation applies.

$$C1 < L (\alpha 1 \bullet t1 - \alpha 0 \bullet t0)$$

Figure 3:
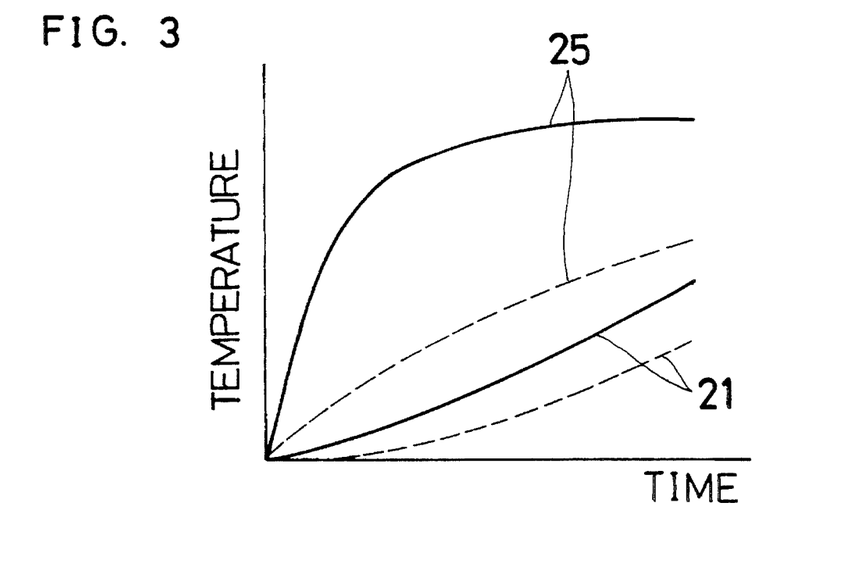
FIG. 3 shows a graph indicating the time-dependant temperature variations of a front housing and a clutch assembly used in the coupling device shown in FIG. 1.

When the relative rotation occurs between the housing 10 and the rotational shaft 11, the clutch assembly 14 rises in temperature to expand thermally. Since the temperature at the inside of the clutch assembly 14 abruptly rises due to the agitation of lubrication oil and due to the heat caused by the slight contact between the clutch discs 15, 16, while the temperature at the outside of the clutch assembly 14, namely at the housing 10 does not rise abruptly. This brings about the difference in temperature between the clutch assembly 14 and the housing 10, and such temperature difference becomes remarkable as the relative rotational speed difference between the housing 10 and the rotational shaft 11 increases. FIG. 3 is illustrative of how the temperatures of the clutch assembly 14 and the housing 10 change in the course of time, wherein the solid lines indicate those temperatures at a large relative rotational speed while the dashed lines indicate those temperatures at a small relative rotational speed.

Figure 4:
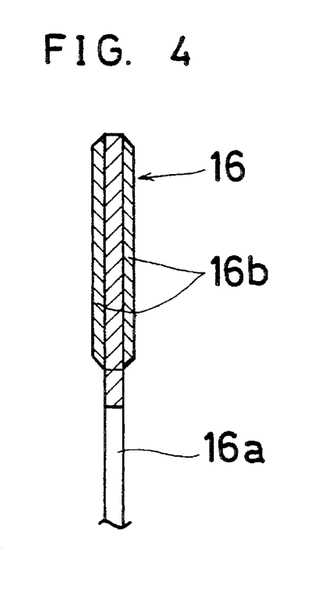
FIG. 4 shows a fragmentary sectional view of one of the clutch discs used in the coupling device shown in FIG. 1.

The housing 10 is made of a material such as, for example, aluminum, and the clutch discs 15, 16 of the clutch assembly 14 are so constructed that friction material with a higher thermal coefficient than that of the housing 10 are adhered onto steel core discs. Typically, FIG. 4 shows the details of one of the inner clutch discs 16. Each inner disc 16 comprise a steel core plate 16a and a pair of clutch papers 16b adhered to opposite end surfaces of the core plate 16a. The clutch papers 16b are commercially available as clutch paper material with an identification number "D 0526-30" from Dynax Ltd., Chitose, Hokkaido, Japan. In the embodiment described herein, in order to bring the clutch assembly 14 into a humping state referred to later in detail, the clutch assembly 14 comprising six inner discs 16 and seven other discs has to be given a capability of thermally expanding through, e.g., one-hundred fifty (150) micrometers in its axial direction. To this end, the clutch paper material is subjected to a lapping process. This process is carried out under the condition, for example, that the core plate 16a is placed on a lapping table (not shown) with the clutch paper 16b at one side thereof being in sliding contact with the lapping table and is rotated at 400 rpm for about 10 seconds under the pressure of 20 kg/cm². The same lapping process is then carried out with the other clutch paper 16b of the same core plate 16a being in sliding contact with the lapping table. Through this lapping process, the clutch papers 16b on the core plate 16a are not only smoothened at their surfaces, but also somewhat hardened to have a capability of thermally expanding.

Consequently, the clutch assembly 14 is able to thermally expand larger than the housing 10 does, due to the difference in their coefficients of thermal expansion as well as the difference in temperature therebetween. Thus, when the temperature difference between the clutch assembly 14 and the housing 10 reaches a predetermined value thereby to make the difference in thermal expansion between the clutch assembly 14 and the housing 10 exceed the initial clearance C1, a compression force acts on the clutch assembly 14 to bring the outer and inner discs 15, 16 into direct connection, whereby the transmission of a large torque can be realized.

As described above, by properly adjusting or tuning the initial clearance C1 in such a manner that a compression force acts on the clutch assembly 14 due to the thermal expansion difference between the clutch assembly 14 and the housing 10 when the relative rotational speed difference between the housing 10 and the rotational shaft 11 causes the temperature difference between the clutch assembly 14 and the housing 10 to reach a predetermined value, it becomes possible to make the transmissive torque increase at a desired relative rotational speed.

In order that the transmissive torque rises at the relative rotational speed of more than 200 rpm for example, the clearance C1 is tuned up by adjusting the position of the rear housing 13 to make the relation between the thermal expansion coefficients α1, α0 and the clearance C1 satisfy the following equation when the temperature of the clutch assembly 14 reaches t11 due to the relative rotational speed exceeding the 200 rpm (where the temperature t01 of the housing 10 at this time is lower than t11). The rigidity of the clutch assembly 14 at this time is, of course, sufficiently high.

$$C1 < L (\alpha1 \cdot t11 - \alpha0 \cdot t01)$$

Upon completion of the position adjustment, the rear housing 13 is secured by, e.g., welding not to rotate relative to the front housing 10.

A second embodiment of the present invention will be described with reference to FIGS. 5 and 6 hereinafter.

Figure 5:
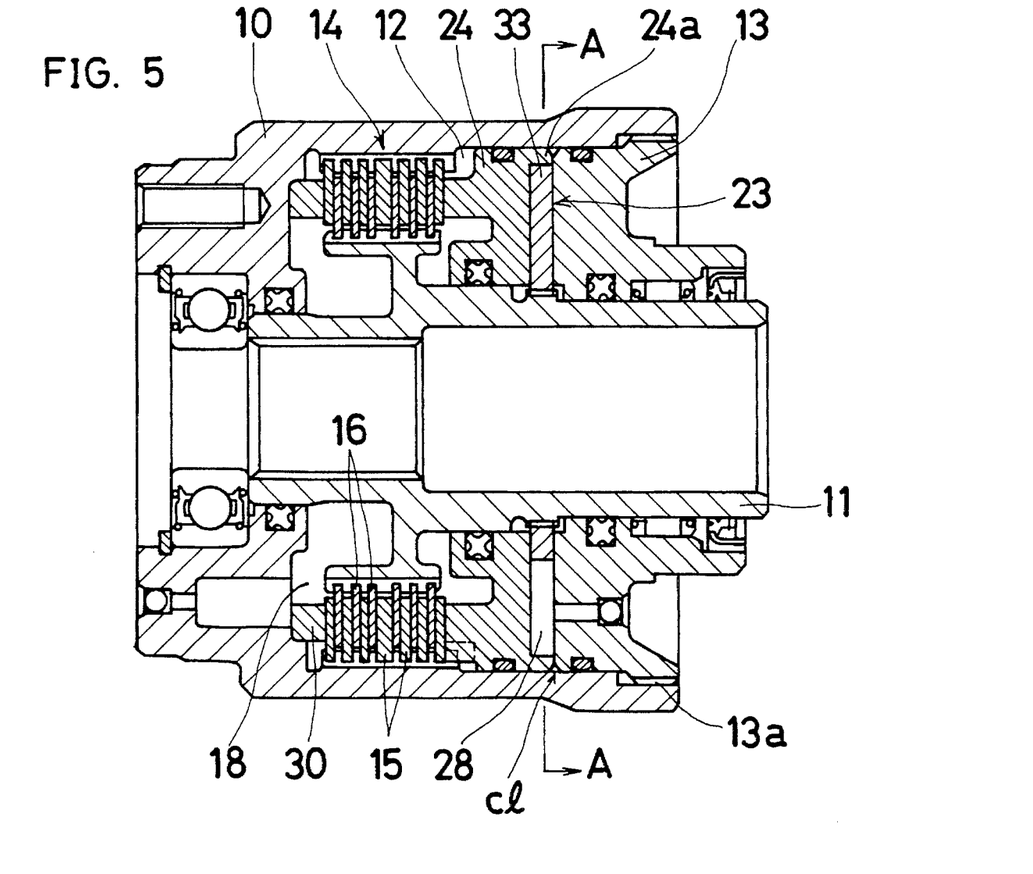
FIG. 5 shows a sectional view of a second embodiment of a torque coupling device according to the present invention.
Figure 6:
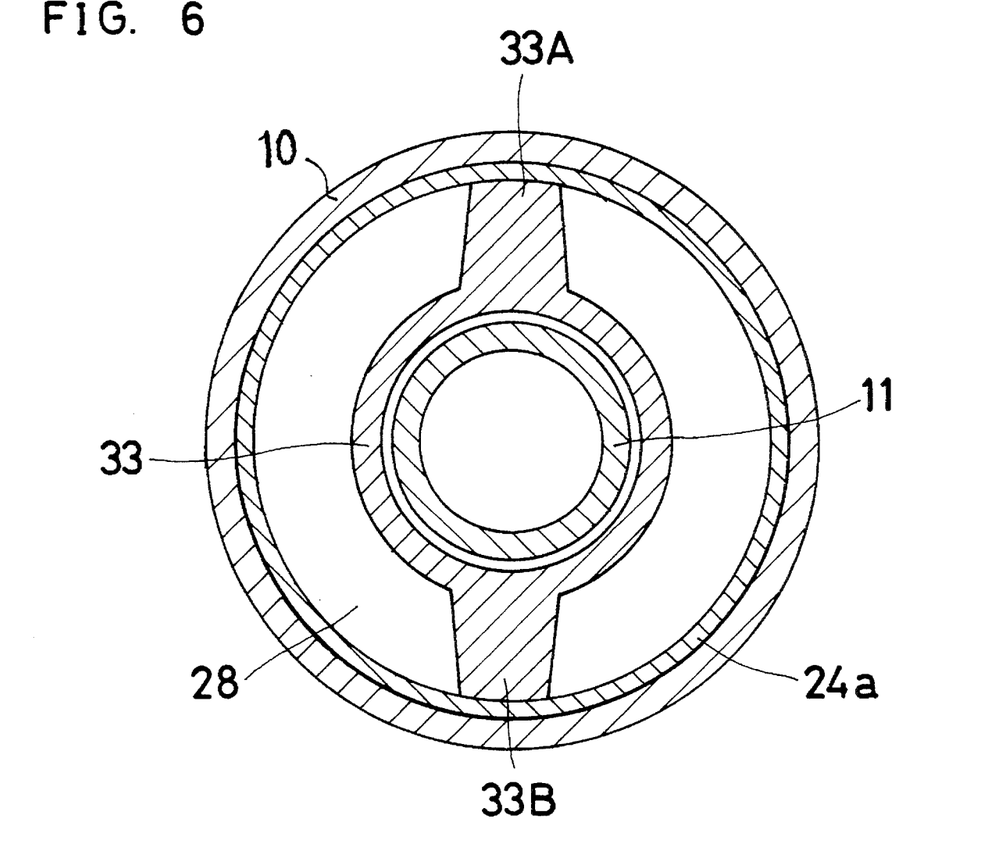
FIG. 6 shows a cross-sectional view of the coupling device, taken along the line A—A in FIG. 5.

Referring now to FIG. 5, there is shown a torque coupling device preferably for four-wheeled vehicles. The coupling device primarily comprises a front housing 10, a rotational shaft 11 coaxially and rotatably supported in the front housing 10, pressure generating means 23 for generating a pressure which depends on the rotational difference between the front housing 10 and the rotational shaft 11, a piston 24 responsive to the pressure generated by the pressure generating means 23, and a multiple-disc clutch assembly 14 which is brought into the state of friction contact when pressed by the piston 23.

The front housing 10 defines a bore 12 opening at its one end and closed at its other end. The open end of the bore 12 is closed by a rear housing 13 which is threadedly secured at the open end for position adjustment. The piston 24 is axially slidably received within the bore 12 to define a narrow annular spacing 28 between itself and the rear housing 13 and is engaged with a spline gear portion formed internally of the front housing 10 to be prevented from rotating relative thereto. Reference numeral 30 denotes a spacer interposed between the bottom surface and the clutch assembly 14.

One end surface of the piston 24 and the inner end of the rear housing 13 define therebetween the narrow annular spacing 28, within which a rotational member 33 like an impeller whose axial width is slightly narrower than that of the spacing 28 is received to be rotationally slidable on the piston 24 and the rear housing 13. As shown in FIG. 6, the rotational member 33 is in spline-engagement at its center boss portion with the outer surface of the rotational shaft 11 and is provided with two (or three, as the case may be) blades 33A, 33B each extending radially. The blades 33A, 33B are also in sliding contact at their arcuate top surfaces with the internal surface of an annular flange portion 24a of the piston 24 which portion is in abutting with the rear housing 13. The spacing 28 is filled with a viscous fluid the viscosity of which is relatively high, such as silicon oil. The viscous fluid occupies 87 though 95 volume percents or, desirably, 89 through 92 volume percents of the vacancy of the spacing 28.

Figure 9:
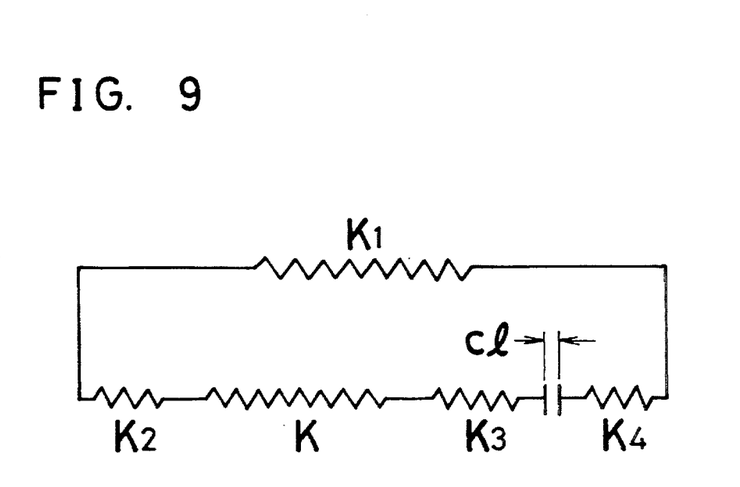
FIG. 9 shows an explanatory view of another rigidity model representing the coupling device shown in FIG. 5.

FIG. 9 shows a rigidity model representing the coupling device shown in FIG. 5. Reference character K denotes the rigidity of the clutch assembly 14, K1 the rigidity of the front housing 10, K2 the rigidity of the spacer 30, K3 the rigidity of the piston 24, K4 the rigidity of the rear housing 13, and C1 the initial axial clearance at the end of the clutch assembly 14. Since K1, K2, K3 K4>>K applies, the rigidity model shown in FIG. 9 can be replaced by the simplified one which is described above in the first embodiment with reference to FIG. 2. Therefore, it is to be noted that the devices shown in FIGS. 1 and 5 operate in substantially same principle as long as the clutch lock-up state attributed to the thermal expansion difference between the housing 10 and the clutch assembly 14 is concerned.

With the construction described above, when the rotational member 33 is rotated relatively to the front housing 10, the viscous fluid filled in the spacing 28 is compulsorily displaced at a flow rate corresponding to the rotational speed difference. In this event, the viscous fluid is apt to remain because of adhering to the end surfaces of the piston 24 and rear housing 13, but is moved by the blades 33A, 33B at the slower speed than the blades 33A, 33B. As a result, the viscous fluid concentrates or coheres to the front side of each blade 33A, 33B, whereby a pressure the magnitude of which is in proportion to the rotational speed difference between the rotational member 33 and the housings 10, 13 is generated within the spacing 28. This pressure generating mechanism or principle is described in detail in U.S. Pat. No. 5,063,738 to the same assignee as this application.

The piston 24 is pressed toward the left as viewed in FIG. 5 in response to the pressure generated in the spacing 28 and acts on the clutch assembly 14. This causes the outer discs 15 and the inner discs 16 each to be frictionally connected with those adjoining thereto under the pressure acting on the piston 24, whereby a rotational torque with magnitude corresponding to the rotational speed difference between the housings 10, 13 and the rotational shaft 11 is transmitted therebetween.

The above-described coupling device may be used as a center differential, for example, with the front housing 10 and the rotational shaft 11 being drivingly connected respectively to front and rear road wheel axles (not shown) of a four-wheeled vehicle. In this case, when the vehicle is stuck with one of the road wheels falling in a mud, it may happen that a high rotational speed difference occurs between the housings 10, 13 and the rotational shaft 11. Such a high rotational speed difference results in a substantial difference in axial thermal expansion between the front housing 10 and the clutch assembly 14. When the substantial difference in the thermal expansion becomes larger than the initial clearance C1 existing between the housings 10, 13 and the clutch assembly 25, the same is given a compression force thereby to bring the clutch discs 15, 16 into a full-locking state, whereby the driving torque transmitted between the housings 10, 13 and the rotational shaft 11 and hence, between the front and rear wheel axles of the vehicle abruptly increases, thereby making it possible for the vehicle to escape from the stuck state. This advantageously prevents the high speed rotational difference between the housings 10, 13 and the rotational shaft 11 from continuing for a long period of time, so that the damages of the clutch assembly 14 can be avoided.

As described above, when a high rotational speed difference takes place between the housings 10, 13 and the rotational shaft 11, the torque transmitted by the clutch assembly 14 humps or abruptly rises due to the temperature difference between the clutch assembly 14 and the front housing 10. However, the conduction of heat from the clutch assembly 14 to the front housing 10 causes the temperature difference therebetween to decrease in due course, and the humping state of the clutch assembly 14 does not continue so long.

On the other hand, the heat from the clutch assembly 14 is conducted to the silicon oil within the spacing 28 by way of the piston 24. This causes the silicon oil to gradually rises in temperature and thereby to expand its volume. In this event, because the filling rate of the silicon oil is so high as 87–95 volume percents, the humping state of the clutch assembly 14 is brought about wherein the pressing force of the piston 24 is augmented as a result of the thermal expansion of the silicon oil. A time delay occurs for the silicon oil to rise to the temperature that effects the humping state of the clutch assembly 14.

Consequently, where the escapement of the vehicle from the stuck state cannot be done within a short period of time so as to make the speed difference continue high for a relatively long period, the temperature difference between the clutch assembly 14 and the front housing 10 decreases so that the humping state of the clutch assembly 14 discontinues. Subsequent to the discontinuation, there occurs the humping state of the clutch assembly 14 owing to, at this time, the thermal expansion of the silicon oil. Thus, the high torque transmitting condition can be kept by the clutch humping state due to the thermal expansion of the silicon oil even after the discontinuation of the clutch humping state due to the temperature difference between the clutch assembly 14 and the front housing 10.

Figure 7:
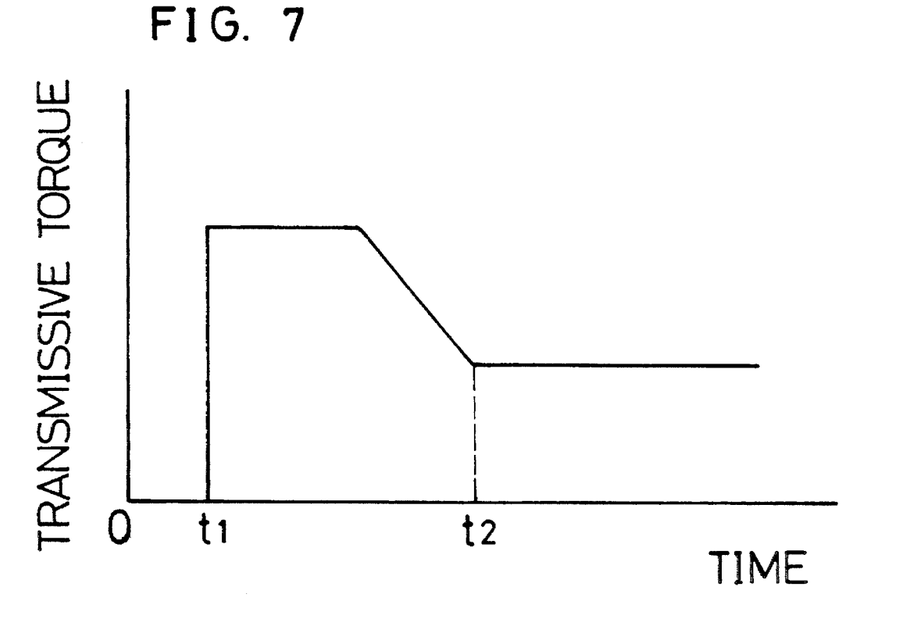
FIG. 7 shows a graph indicating the relationship between the time period of a vehicle being in a stuck state and the transmissive torque required for the vehicle to escape from the stuck state.
Figure 8:
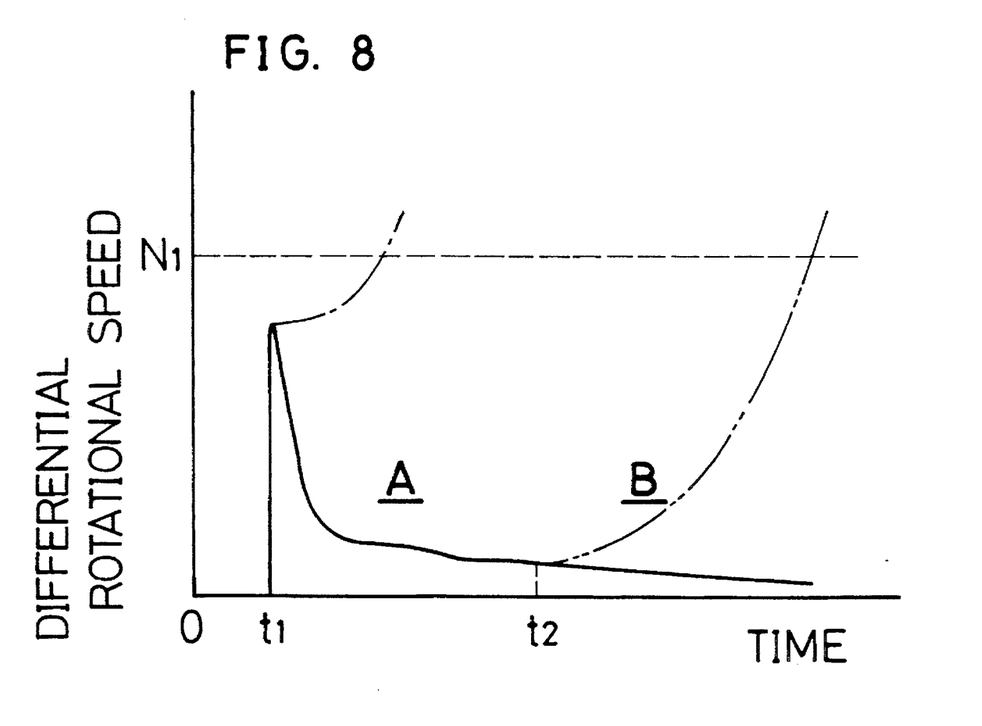
FIG. 8 shows a graph indicating the relationship between the time period of a vehicle being in a stuck state and the rotational speed difference between a front housing and a rotational shaft used in the coupling device shown in FIG. 5.

FIG. 8 shows the variation in the rotational speed difference between the housing 10 and the rotational shaft 11 in the case where the vehicle runs on a sandy or muddy road which requires a critical transmissive torque shown in FIG. 7. As understood from FIG. 7, in running on the sandy or muddy road, the vehicle needs a larger transmissive torque at the initial stage of starting from the stopped condition and once beginning to run, only needs a smaller transmissive torque which is nevertheless relatively high.

As shown in FIG. 8, in the initial region A, the rotational speed difference is restrained by the clutch humping which is effected by the temperature difference between the housing 10 and the clutch assembly 14. When this state continues for a long time, the subsequent state in region B comes, in which the rotational speed difference is restrained by the clutch humping which is effected by the thermal expansion of the silicon oil. In FIG. 8, the one-dotted chain line indicates the case that only the clutch humping owing to the temperature difference is acting, while the two-dotted chain line indicates the case that only the clutch humping owing to the thermal expansion of the silicon oil is acting, and it is noted that in either case, the rotational speed difference for a long time would exceed a critical level N1 at which the clutch discs 15, 16 are damaged to burn.

In short, even under such a bad condition that clutch discs 15, 16 are usually damaged to burn, the clutch humping owing to the temperature difference and the clutch humping owing to the thermal expansion of the silicon oil act in a well-balanced or complemental manner, whereby substantially the four-wheel direct driving status can be maintained for a long time period, thereby improving the vehicle with the coupling device in the capability of driving through a sandy or muddy road as well as in the capability of escaping from the stuck state.

Although in the aforementioned embodiments, the axial clearance C1 is adjusted by adjusting the position of the rear housing 13, it can otherwise be adjusted by changing the spacer 30, the rear housing 13 or the like, or by altering the axial widths of those.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque coupling device comprising:

a housing adapted to be connected with one of two relatively rotatable shafts;

a rotational shaft rotatably supported in said housing and adapted to be connected with the other of said two shafts;

a clutch assembly including plural clutch discs received within said housing for transmitting rotational torque between said housing and said rotational shaft; and means for tuning an initial clearance in axial direction between said housing and said clutch assembly so that when the relative rotation between said housing and said rotational shaft causes a certain temperature difference between said housing and said clutch assembly, the difference in thermal expansion between said housing and said clutch assembly brings said clutch discs into friction connection to transmit a rotational torque between said housing and said rotational shaft, wherein said initial clearance between said housing and said clutch assembly is tuned to satisfy the following equation:

$$Cl < L\ (\alpha 1 \bullet t1 - \alpha 0 \bullet t0)$$

where α0: thermal expansion coefficient of said housing
α1: thermal expansion coefficient of said clutch assembly
Cl: initial axial clearance between said housing and said clutch assembly
L: axial length of said clutch assembly
t0: temperature of said housing
t1: temperature of said clutch assembly.

2. A torque coupling device comprising:
a housing adapted to be connected with one of two relatively rotatable shafts;
a rotational shaft rotatably supported in said housing and adapted to be connected with the other of said two shafts;
pressure generating means received in said housing and activated upon the rotational speed difference between said housing and said rotational shaft for displacing a viscous fluid within an axially narrow spacing to generate a pressure;
a piston received within said housing and axially movable responsive to the pressure generated by said pressure generating means;
a clutch assembly including plural clutch discs interposed within said housing between one axial inner end of said housing and one axial end of said piston and arranged to be pressed upon the axial movement of said piston for transmitting rotational torque between said housing and said rotational shaft; and
means for tuning an initial clearance in axial direction between said housing and said clutch assembly so that when the relative rotation between said housing and said rotational shaft causes a certain temperature difference between said housing and said clutch assembly, the difference in thermal expansion between said housing and said clutch assembly brings said clutch discs into friction connection to transmit a rotational torque between said housing and said rotational shaft,
wherein said initial clearance between said housing and said clutch assembly is tuned to satisfy the following equation:

$$Cl < L\ 9\alpha 1 \bullet t1 - \alpha 0 \bullet t0)$$

α0: thermal expansion coefficient of said housing
α1: thermal expansion coefficient of said clutch assembly
Cl: initial axial clearance between said housing and said clutch assembly
L: axial length of said clutch assembly
t0: temperature of said housing
t1: temperature of said clutch assembly.

3. A torque coupling device as set forth in claim 2, wherein silicon oil is filled as said viscous fluid in said axially narrow spacing up to eighty-seven (87) through ninety-five (95) volume percents of the vacancy therein.

4. A torque coupling device as set forth in claim 2, wherein said piston defines one end surface of said axially narrow spacing to be responsive directly to the pressure generated by said pressure generating means.

5. A torque coupling device as set forth in claim 2, wherein:
said pressure generating means includes an impeller having at least two radially extending blades and received within said axially narrow spacing to be rotatable bodily with said rotational shaft, and
silicon oil is filled as said viscous fluid in said axially narrow spacing up to eighty-seven (87) through ninety-five (95) volume percents of the vacancy therein.

6. A torque coupling device comprising:
a housing adapted to be connected with one of two relatively rotatable shafts;
a rotational shaft rotatably supported in said housing and adapted to be connected with the other of said two shafts;
a clutch assembly including plural clutch discs received within said housing for transmitting rotational torque between said housing and said rotational shaft; and
means for tuning an initial clearance in axial direction between said housing and said clutch assembly so that when the relative rotation between said housing and said rotational shaft causes a certain temperature difference between said housing and said clutch assembly, the difference in thermal expansion between said housing and said clutch assembly brings said clutch discs into friction connection to transmit a rotational torque between said housing and said rotational shaft,
wherein said housing comprises a front housing and a rear housing closing an open end of said front housing, and wherein said means for tuning said initial clearance comprises screw means provided between an internal surface of the open end of said front housing and an external surface of said rear housing.

7. A torque coupling device comprising:
a housing adapted to be connected with one of two relatively rotatable shafts;
a rotational shaft rotatably supported in said housing and adapted to be connected with the other of said two shafts;
pressure generating means received in said housing and activated upon the rotational speed difference between said housing and said rotational shaft for displacing a viscous fluid within an axially narrow spacing to generate a pressure;
a piston received within said housing and axially movable responsive to the pressure generated by said pressure generating means;
a clutch assembly including plural clutch discs interposed within said housing between one axial inner end of said housing and one axial end of said piston and arranged to be pressed upon the axial movement of said piston for transmitting rotational torque between said housing and said rotational shaft; and
means for tuning an initial clearance in axial direction between said housing and said clutch assembly so that when the relative rotation between said housing and said rotational shaft causes a certain temperature difference between said housing and said clutch assembly, the difference in thermal expansion between said housing and said clutch assembly brings said clutch discs into friction connection to transmit a rotational torque between said housing and said rotational shaft, wherein said housing comprises a front housing and a rear housing closing an open end of said front housing, and wherein said means for tuning said initial clearance comprises screw means provided between an internal surface of the open end of said front housing and an external surface of said rear housing.

* * * * *